United States Patent
Lee

(10) Patent No.: US 9,614,775 B2
(45) Date of Patent: Apr. 4, 2017

(54) DATA TRANSMISSION USING MODIFIED WEIGHTED FAIR QUEUE ALGORITHM

(71) Applicant: VMware, Inc., Palo Alto, CA (US)

(72) Inventor: Philip Donald Lee, London (GB)

(73) Assignee: VMware, Inc., Palo Alto, CA (US)

(*) Notice: Subject to any disclaimer, the term of this patent is extended or adjusted under 35 U.S.C. 154(b) by 105 days.

(21) Appl. No.: 14/609,842

(22) Filed: Jan. 30, 2015

(65) Prior Publication Data

US 2016/0226776 A1 Aug. 4, 2016

(51) Int. Cl.
*H04L 12/851* (2013.01)
*H04L 12/875* (2013.01)
*H04L 12/841* (2013.01)
*H04L 12/833* (2013.01)

(52) U.S. Cl.
CPC ...... *H04L 47/2441* (2013.01); *H04L 47/2458* (2013.01); *H04L 47/283* (2013.01); *H04L 47/562* (2013.01)

(58) Field of Classification Search
None
See application file for complete search history.

(56) References Cited

U.S. PATENT DOCUMENTS

2007/0121504 A1* 5/2007 Hellenthal .......... H04L 12/5693 370/230
2013/0343194 A1* 12/2013 Agarwal ............... H04W 28/10 370/235

OTHER PUBLICATIONS

Weighted fair queueing, [Retrieved on Jul. 30, 2015]. Retrieved from the Internet: <https://en.wikipedia.org/wiki/Weighted_fair_queueing>.

* cited by examiner

*Primary Examiner* — Diane Lo
(74) *Attorney, Agent, or Firm* — Patterson & Sheridan LLP

(57) ABSTRACT

To transmit data packets over a shared data path, data packets of a first message and a second message are received and stored, respectively, in first and second queues. First and second data packets are then extracted from, respectively, the first and second messages. First and second priority values are calculated, respectively, for the first and second data packets and are associated thereto. If the first priority value is determined to be lower than the second priority value, then the first packet is transmitted over the shared data path. If the second priority value is determined to be lower than the first priority value, then the second packet is transmitted over the shared data path.

20 Claims, 5 Drawing Sheets

| Time | Event | Virtual Time | Queues | Next Packet Tag | Queued Bytes |
|---|---|---|---|---|---|
| 1 | 16,000 byte message arrives in queue 200; Place 4,000 byte chunk for queue 200 in priority queue | 0 | 200 | 40,000 | 16,000 |
| | | | 201 | N/A | 0 |
| | | | 202 | N/A | 0 |
| 2 | Send 4,000 byte chunk from queue 200 to LAN 140; Place another 4,000 byte chunk for queue 200 in priority queue | 40,000 | 200 | 80,000 | 12,000 |
| | | | 201 | N/A | 0 |
| | | | 202 | N/A | 0 |
| 3 | 12,000 byte message arrives in queue 201; Place 4,000 byte chunk for queue 201 in priority queue | 40,000 | 200 | 80,000 | 12,000 |
| | | | 201 | 100,000 | 12,000 |
| | | | 202 | N/A | 0 |
| 4 | Send 4,000 byte chunk from queue 200 to LAN 140; Place another 4,000 byte chunk for queue 200 in priority queue | 80,000 | 200 | 120,000 | 8,000 |
| | | | 201 | 100,000 | 12,000 |
| | | | 202 | N/A | 0 |
| 5 | 8,000 byte message arrives in queue 202; Place 4,000 byte chunk for queue 202 in priority queue | 80,000 | 200 | 120,000 | 8,000 |
| | | | 201 | 100,000 | 12,000 |
| | | | 202 | 160,000 | 8,000 |
| 6 | Send 4,000 byte chunk from queue 201 to LAN 140; Place another 4,000 byte chunk for queue 201 in priority queue | 100,000 | 200 | 120,000 | 8,000 |
| | | | 201 | 160,001 | 8,000 |
| | | | 202 | 160,000 | 8,000 |

FIG. 3A

| Time | Event | Virtual Time | Queues | Next Packet Tag | Queued Bytes |
|---|---|---|---|---|---|
| 7 | Send 4,000 byte chunk from queue 200 to LAN 140; Place another 4,000 byte chunk for queue 200 in priority queue | 120,000 | 200 | 160,002 | 4,000 |
| | | | 201 | 160,001 | 8,000 |
| | | | 202 | 160,000 | 8,000 |
| 8 | Send 4,000 byte chunk from queue 202 to LAN 140; Place another 4,000 byte chunk for queue 202 in priority queue | 160,000 | 200 | 160,002 | 4,000 |
| | | | 201 | 160,001 | 8,000 |
| | | | 202 | 240,000 | 4,000 |
| 9 | Send 4,000 byte chunk from queue 201 to LAN 140; Place another 4,000 byte chunk for queue 201 in priority queue | 160,001 | 200 | 160,002 | 4,000 |
| | | | 201 | 220,001 | 4,000 |
| | | | 202 | 240,000 | 4,000 |
| 10 | Send 4,000 byte chunk from queue 200 to LAN 140 | 200,002 | 200 | N/A | 0 |
| | | | 201 | 220,001 | 4,000 |
| | | | 202 | 240,000 | 4,000 |
| 11 | Send 4,000 byte chunk from queue 201 to LAN 140 | 280,001 | 200 | N/A | 0 |
| | | | 201 | N/A | 0 |
| | | | 202 | 240,000 | 4,000 |
| 12 | Send 4,000 byte chunk from queue 202 to LAN 140 | 320,000 | 200 | N/A | 0 |
| | | | 201 | N/A | 0 |
| | | | 202 | N/A | 0 |

FIG. 3B

DATA TRANSMISSION USING MODIFIED WEIGHTED FAIR QUEUE ALGORITHM

BACKGROUND

Weighted fair queuing algorithms provide data packet scheduling techniques that allow for different scheduling priorities to be assigned to separate data flows (e.g., network traffic streams) over a shared network channel. In weighted fair queuing, each data flow has a separate first-in first out (FIFO) queue. The benefits of weighted fair queuing arise because, as the queues are serviced simultaneously, an "ill-behaved" data flow (i.e., a data flow that has sent either larger packets or more packets per second than other data flows) may be scheduled at a lower priority than other, more "well-behaved" data flows, thus leaving well-behaved data flows generally unaffected.

However, implementations that use weighted fair queuing may, under some circumstances, suffer from performance issues. For example, in typical weighted fair queuing implementations, each FIFO queue is assigned an overall priority, which results in the assignment of the queue priority to all data packets in the queue. If the priority assigned to a FIFO queue is changed, then all data packets in that queue must be updated to reflect the new priority. This entails halting data transmission in all queues, accessing each packet in the queue, updating each packet, and then resuming data transmission. In a server environment that supports multiplexed data communication for time-sensitive applications, the delay resulting from this updating of queue packets may be unacceptable.

SUMMARY

In a first embodiment, a method of transmitting data packets over a shared data path is provided. The method includes the steps of receiving and storing data packets of a first message in a first queue and extracting a first data packet from the first message. The method further includes receiving and storing data packets of a second message in a second queue and extracting a second data packet from the second message. The method further includes the steps of calculating first and second priority values, and associating the first and second priority values, respectively, to the first and second data packets. The method further includes determining which of the first and second priority values is a lower value. If the first priority value is the lower value, the first data packet is transmitted over the shared data path. If the second priority value is the lower value, the second data packet is transmitted over the shared data path.

A second embodiment provides a non-transitory computer-readable medium that includes instructions that, when executed, enable a host computer to implement one or more aspects of the above method.

A third embodiment provides a computer system that includes a processor, memory, and an interface, where the processor is programmed to cause the host computer to implement one or more aspects of the above method.

BRIEF DESCRIPTION OF THE DRAWINGS

FIGS. 3A and 3B each depict a chronology for receiving messages and transmitting data chunks by a data transmission process, according to one or more embodiments.

DETAILED DESCRIPTION

Figure 1:
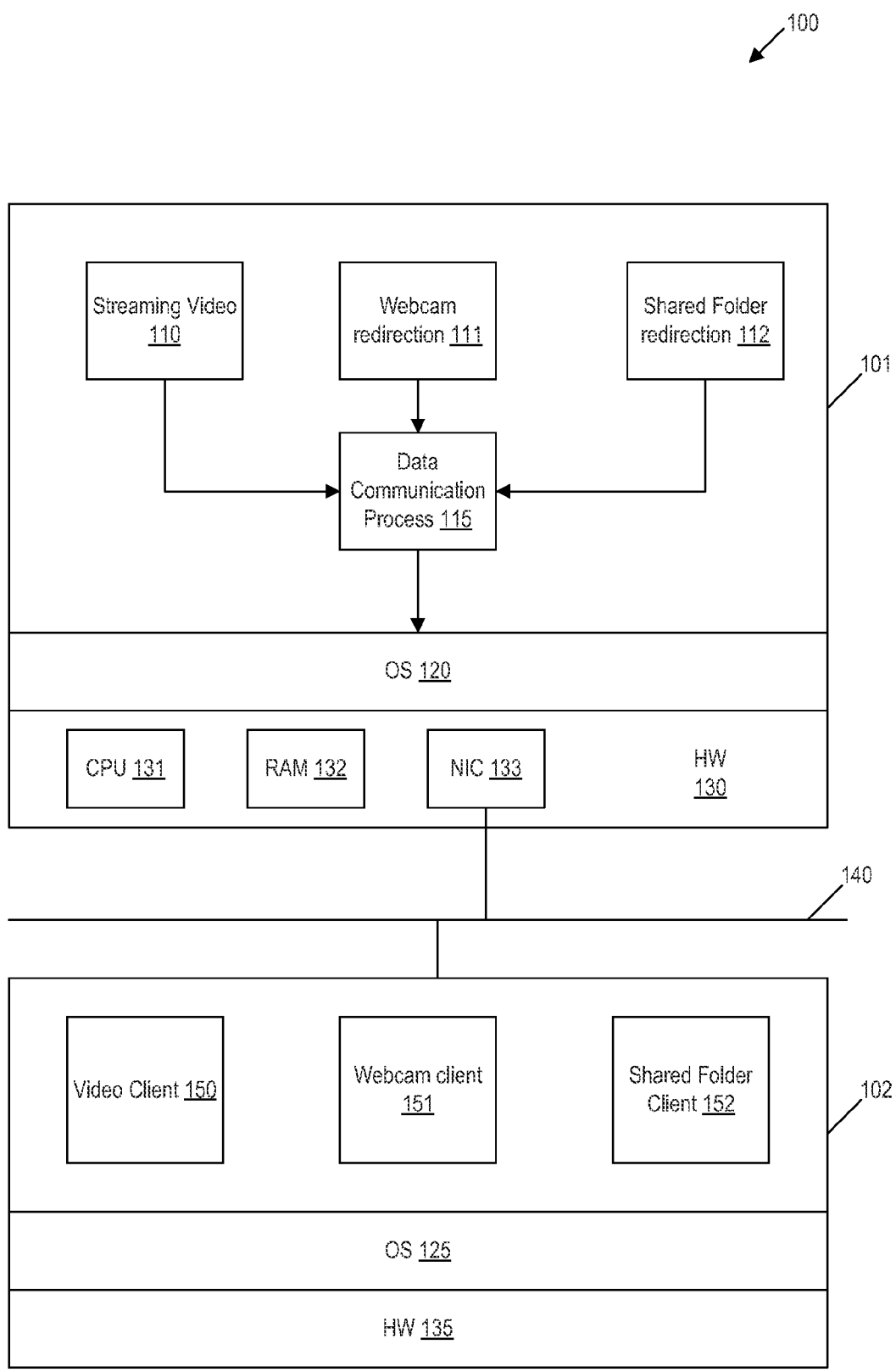
FIG. 1 depicts a computer system in which one or more embodiments may be implemented.

FIG. 1 depicts a computer system 100 in which one or more embodiments may be implemented. FIG. 1 includes a computer host 101, a local area network (LAN) 140, and three client computers: video client 150, webcam client 151, and shared folder client 152. Computer host 101 may be a desktop computer, workstation, or laptop computer. In typical embodiments, host 101 is a server-class computer. Host 101 includes a hardware platform 130, which includes one or more central processing units (CPUs) 131, a random access memory (RAM) 132, and a network interface controller (NIC) 133. Hardware platform 130 also may include a variety of hardware adapters that enable host 101 to communicate with peripheral devices. For example, hardware platform may include a host bus adapter (not shown) that allows host 101 to access a Small Computer System Interface (SCSI) hard drive, a high-speed storage area network (such as Fibre Channel), or a serial ATA storage device. In addition, hardware platform 130 may also include an adapter for a video camera (such as a webcam).

Operating system (OS) 120 manages the components of hardware platform 130 and provides services for computer applications executing on host 101. According to embodiments, OS 120 may be any of a number of commercially available operating systems, such as Microsoft Windows®, Linux®, or the OS X operating system from Apple, Inc. In embodiments where host 101 is a host computer that provides a virtualized computing platform, OS 120 may be a hypervisor that supports the execution of virtual machines (VMs) on host 101. One example of such a hypervisor is VMware's ESX® offering. Other hypervisors include Microsoft's Hyper-V® and Xen.

As shown in FIG. 1, OS 120 supports the execution of a variety of applications. These applications may be stand-alone applications, applications deployed as or within VMs, and applications deployed as virtual appliances, which is a software image that includes a software stack designed to run on a virtualized computing platform (i.e., a hypervisor). Among the applications depicted in FIG. 1 are streaming video 110, webcam redirection 111, and shared folder redirection 112.

In the example depicted, streaming video 110 is a server-side application that accepts and responds to requests for one or more video streams. Video may be streamed from a multimedia video file saved on a storage device (not shown) accessible to host 101. Webcam redirection 111 is an application that processes video input from a webcam (not shown) that is accessible to host 101 either locally or over a network. The processed video is then streamed by webcam redirection 111 over a network. Finally, shared folder redirection 112 accesses folders created locally on host 101 and transmits the files and data saved in those folders to a remote computer for storage. Typically, the remote computer has greater storage capacity than the local host. It should be noted that the depicted applications (110, 111, and 112) are only examples of applications that may be deployed in embodiments. Indeed, any application (whether virtualized or standalone) that transmits data over a network is within the scope of the present invention.

Each of streaming video 110, webcam redirection 111, and shared folder redirection 112 transmits data to data communication process 115. In one or more embodiments, in order to transmit data to data communication process 115, each of the aforementioned applications establishes a port connection to data communication process 115. In other embodiments, each of the aforementioned applications may invoke a method in data communication process 115 using a remote procedure call (RPC). If port connections are used, the applications may each establish a connection to the same port. However, in other embodiments, data communication process 115 is configured to allocate more than one port, each port being allocated for one connecting application.

Data communication process 115 also executes within host 101, at the application level. In one or more embodiments, data communication process 115 utilizes a communication protocol to enable communication between applications running on a host computer and (such as host 101) and one or more remote clients. Data communication process 115 accepts connection requests from applications that need to transmit data to remote clients and multiplexes the transmission of data over a network to the remote clients. Once data communication process 115 receives data from one or more applications, data communication process divides the data into fixed size "chunks" and transmits the data chunks over the network to a remote destination. The data chunk size represents the size of data that data communication process 115 transmits over a network for a remote destination at any one time. In one embodiment, the chunk size may be simply be a hardcoded value (e.g., 4 kB) that is the same for all channels of data, although it is not required that the chunk size be hardcoded or the same for all channels.

In one or more embodiments, data communication process 115 addresses each chunk to a remote destination in order to enable network software layers in OS 120 to properly transmit the chunks (which may themselves be further divided into data packets or frames) to the correct destination. The addressing may be performed by data communication process 115 by, for example, appending a header to each data chunk that is to be transmitted. As will be described below in further detail, data communication process 115 schedules chunks for transmission according to a predetermined algorithm in order to ensure fairness in data transmission. This prevents one particular application from monopolizing the network connection over which data communication process 115 transmits data.

Data communication process 115 transmits data, according to one or more embodiments, by opening a connection to the remote destination by opening and connecting a stream socket using the address of the remote destination. Data communication process 115 then sends each chunk over the stream socket using, e.g., the send( ) function, as provided in the sys/socket.h header file included with Linux and other Unix-based operating systems. Network software layers (e.g., the TCP/IP protocol stack) handles the transmission of the data chunks at the physical layer (i.e., utilizing NIC 133). As shown, NIC 133 is connected to LAN 140. In some embodiments, LAN 140 is an Ethernet local area network, while in other embodiments, LAN 140 may be a token-ring LAN, a metropolitan-area network, or even a wide-area network.

Video client 150, webcam client 151, and shared folder client 152 are applications running in a client computer 102 having hardware 135 and an OS 125 similar to those discussed above with respect to host 101. Client computer 102 is remote from host 101 and communicates with host 101 over LAN 140. In particular, video client 150 receives video data transmitted by streaming video 110, webcam client 151 receives webcam (i.e., "live-streamed") video transmitted by webcam redirection 111, and shared folder client 152 receives data saved by shared folder redirection 112. All three applications have a network address on LAN 140, which each of the corresponding applications on host 101 transmits data to. As previously mentioned, data communication process 115 divides the data transmitted by the applications on host 101 into fixed sized chunks, and directs the fixed size chunks to the appropriate remote client based on a modified weighted fair queue algorithm. It should also be noted that streaming video 110, webcam redirection 111, and shared folder redirection 110 need not execute on the same host 101. Indeed, according to some embodiments, one or more of these applications may execute on a separate computer host and open a remote port connection with data communication process 115.

Figure 2:
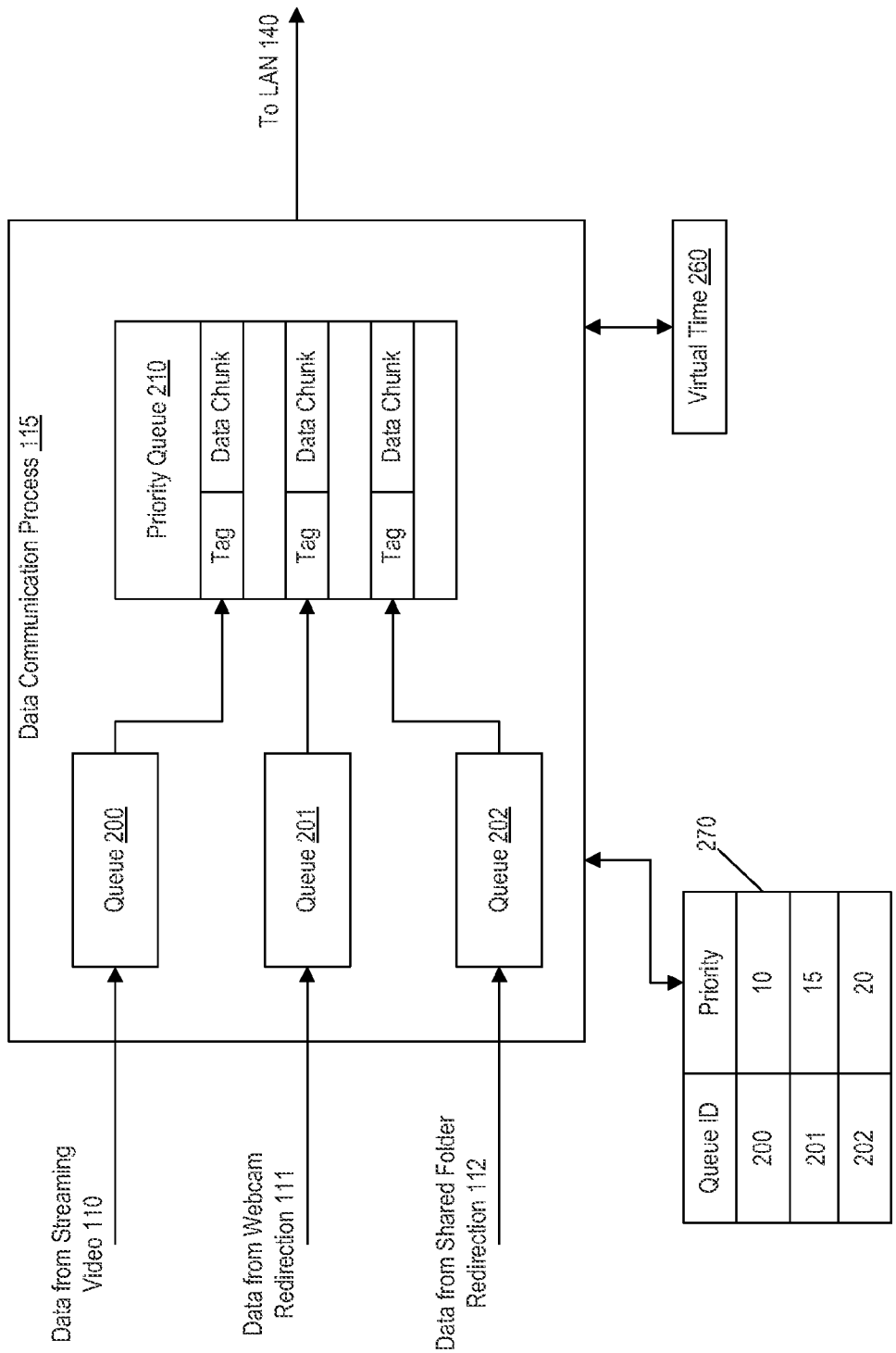
FIG. 2 is a conceptual diagram that depicts data structures utilized by a data communication process to transmit data to one or more remote clients, according to embodiments.

FIG. 2 is a conceptual diagram that depicts the data structures utilized by data communication process 115 to transmit data to one or more remote clients, according to embodiments. Data communication process 115 receives connection requests from applications (for example, over a single port connection). In response to receiving a connection request for a particular application, data communication process allocates a queue for that application. The allocated queue receives data (referred to herein as messages) from the application.

When an initial connection request is transmitted from an application to data communication process 115, the connection request includes a parameter that specifies a particular priority for the queue that data communication process 115 creates. After receiving the connection request for a given application, data communication process 115 associates the priority with a corresponding queue.

In the example shown in FIG. 2, connection requests have been received by data communication process 115 from each of streaming video 110, webcam redirection 111, and shared folder redirection 112. In response to receiving the connection requests, data communication process 115 creates queue 200 (which receives messages from streaming video 110), queue 201 (which receives messages from webcam redirection 111), and queue 202 (which receives messages from shared folder redirection 112). In addition, data communication process 115 saves the parameters received with the connection requests in a table 270. Thus, assuming that the connection request received from streaming video 110 includes a priority value of 10, data communication process 115 saves a row in table 270 that associates queue 200 (the queue that was created for streaming video 110) with the priority value of 10. Thus, when data communication process 115 transmits data for streaming video 110, data transmission 110 transmits, e.g., a next 4,000 bytes (assumed as the preconfigured chunk size, for illustrative purposes) of the message received from streaming video 110 and placed into queue 200. If the message received from streaming video 110, or a not-yet-transmitted portion thereof, is fewer than 4,000 bytes in size, then data transmission process 115 transmits the entire remaining message. That is, the message size is either 4,000 bytes or the remainder of the message where there are less than 4,000 bytes remaining. In one embodiment, messages may also be permitted to be greater than 4,000 bytes up to, e.g., 4,700 bytes in the case where there is up to 4,700 bytes left in the queue.

In similar fashion, data transmission process 115 allocates queue 201 in response to receiving a connection request from webcam redirection 111. In addition, data communication process 115 stores parameters transmitted by webcam redirection 111 (i.e., a priority value of 15) in table 270, and associates those parameters with queue 201. Further, data transmission process 115 allocates queue 202 in response to receiving a connection request from shared folder redirection 112. Data transmission process 115 then stores the priority value of 20. Because, according to some embodiments, a lower priority number indicates that the associated queue has a higher priority, queue 200 (which corresponds to streaming video 110) has a higher priority than queue 201 (which corresponds to webcam redirection 111) by a factor of 50 percent (i.e., 15=10+10×50%). In addition, the priority of queue 200 exceeds the priority of queue 202 (which corresponds to shared folder redirection 112) by a factor of 100 percent (i.e., 20=10+10×100%). Priority and data chunk size, which as discussed may simply be a hardcoded value that is retrieved, are used in computing a "packet tag" for each "next" data chunk to be transmitted from each of queues 200, 201, and 202. The computation of a packet tag for each next data chunk is described below in connection with priority queue 210.

Priority queue 210 contains, for each "application queue" (e.g., queues 200, 201, and 202), the next data chunk to be sent from that queue. Thus, as shown in FIG. 2, priority queue 210 has (at most) three entries: a next data chunk for queue 200, a next data chunk for queue 201, and a next data chunk for queue 202. Thus, when each of queues 200, 201, and 202 has additional data chunks to be transmitted to a remote destination (e.g., the clients depicted in FIG. 1), data communication process 115 moves a next data chunk into priority queue 210. In addition, data communication process 115 computes a packet tag for each next data chunk and associates it with the data chunk moved into queue 210. In order to allocate bandwidth on LAN 140 fairly, data communication process 115 transmits the data chunk having the lowest packet tag value.

According to one or more embodiments, the packet tag value for each next data chunk is computed according to the following formula: packet tag value=virtual time+(queue priority×data chunk size). Virtual time is a stored value maintained by data communication process 115 as virtual time 260. In embodiments, virtual time 260 is stored in RAM 132, while in other embodiments virtual time 260 may be stored persistently on a data storage device. When data communication process 115 is started initially, virtual time 260 is set to zero. As messages arrive in queues allocated by data communication process 115, data communication process 115 computes packet tags for each next data chunk and transmits the data chunk having the lowest packet tag value. After a data chunk is transmitted for a given queue, the virtual time is then reset to equal the packet tag value of the last transmitted data chunk.

For example, if data transmission process 115 receives a connection request from streaming video 110, data transmission process 115 allocates queue 200. In addition, as shown in FIG. 2, data transmission process 115 receives, as a parameter, priority value 10, which data transmission process 115 then stores in table 270. Assume that, subsequent to the connection request, data transmission process 115 receives a message from streaming video 110 that is 8,000 bytes in length. In this case, data transmission process 115 moves, e.g., a next data chunk of 4,000 bytes into priority queue 210 and calculates a packet tag for that data chunk. The packet tag is calculated according to the formula virtual time+(queue priority×data chunk size), or 0+10×4,000, which is equal to 40,000. Since the only queue having data to transmit is queue 200 (i.e., neither queue 201 nor queue 202 has received any data), data transmission process 115 determines that the next data chunk corresponding to queue 200 has the lowest packet tag (i.e., 40,000) and transmits that data chunk to LAN 140.

After transmitting the data chunk to LAN 140, data transmission process 115 updates the virtual time (i.e., virtual time 260) to equal the value of the packet tag of the last transmitted data chunk (i.e., 40,000). Data transmission process 115 then determines that queue 200 has additional data to be transmitted (i.e., the next 4,000 bytes from the 8,000 byte message initially stored in queue 200). Thus, data transmission process 115 moves these 4,000 bytes into priority queue 210 and calculates a new packet tag for this (second) data chunk. The packet tag is computed according to the same formula as before (i.e., virtual time+(queue priority×chunk size)). However, in this instance, the virtual time (i.e., virtual time 260) has been updated to equal 40,000. Thus, the packet tag for the second data chunk to be sent from queue 200 is computed as 40,000+(10×4,000)=80,000. Further, once this second data chunk is transmitted, virtual time 260 is updated to equal 80,000.

It should be noted that the value of virtual time 260 increases monotonically. Thus, since virtual time 260 is stored in a fixed number of bytes at a particular address in memory, as data chunks continue to be transmitted by data transmission process 115, there is the potential that an overflow condition will occur, in which case the value of virtual time 260 will not be accurate. In such a case, data transmission process 115 adjusts virtual time 260 to a "rollover" value, and adjusts the packet tags of all data chunks that are yet to be transmitted accordingly. This process is described in more detail below.

It should also be noted that, in some embodiments, the priority and data chunk size of a given queue may be adjusted dynamically. That is, the priority and data chunk size may be adjusted while a message is waiting in the queue. As previously mentioned, when the priority of a queue is altered in typical weighted fair queuing implementations, all data packets (i.e., data chunks) in the queue are updated. This may be a time-consuming process, as queues may store megabytes of message data at any given time. However, in the embodiments described herein, the packet tag (which is calculated based, in part, on queue priority) is only updated for the next data chunk (as opposed to all data chunks remaining in the queue). Thus, a performance benefit is realized, especially where very large queues of message data are involved.

FIGS. 3A and 3B depict a chronology for receiving messages and transmitting data chunks by data transmission process 115, according to one or more embodiments. FIGS. 3A and 3B illustrate a timeline of events, where messages arrive in each of queues 200, 201, and 202 (as illustrated in FIG. 2), where the parameters corresponding to each queue are stored as depicted in table 270 in FIG. 2. Initially, it is assumed that all three applications on host 101 (i.e., streaming video 110, webcam redirection 111, and shared folder redirection 112) have opened connections with data communication process 115, and the data communication process 115 has created queues 200, 201, and 202. Each of these queues is initially empty.

As illustrated in FIG. 3A, at time 1, a 16,000 byte message arrives in queue 200. Assuming again that the data chunk size is 4,000 bytes, data communication manager 115 computes a packet tag for a next data chunk that is 4,000 bytes in size and moves that data chunk to priority queue 210. The packet tag is computed as virtual time (i.e., 0)+(priority×data chunk size) (i.e., 10×4,000). Thus the packet tag for the data chunk placed in priority queue 210 has value 40,000. Note that the data chunk moved to queue 210 has not been transmitted as of time 1. Thus, the queued bytes for queue 200 remains at 16,000 (i.e., the 4,000 bytes in priority queue 210 and the remaining 12,000 bytes in queue 200). Note also that neither queue 201 nor queue 202 has any queued bytes as of time 1.

Next, at time 2, data communication process 115 transmits the 4,000 byte data chunk from priority queue 210 to the proper remote destination (which is, in this case, video client 150). Data communication process 115 then updates the virtual time to have a value of 40,000, which matches the packet tag of the last transmitted data chunk. Data communication process 115 determines that queue 200 still has additional data to transmit and, as a result, moves another 4,000 byte data chunk into priority queue 210. The packet tag for the next data chunk is set to have a value of 40,000+(10×4,000)=80,000

At time 3, a 12,000 byte message arrives in queue 201. After the message arrives, data communication package moves a 4,000 byte data chunk corresponding to queue 201 into priority queue 210. Data communication process 115 calculates the packet tag for this data chunk as virtual time+(queue priority×data chunk size), or 40,000+15×40,000, which equal 100,000. At the end of time 3, both queues 200 and 201 have 12,000 bytes queued.

Next, at time 4, data transmission process 115 determines that the next data chunk for queue 200 has the lowest packet tag (i.e., 80,000) and thus transmits this packet to LAN 140 for delivery to the appropriate remote client. Having transmitted the data chunk having packet tag 80,000, data transmission process 115 updates virtual time 260 to have a value of 80,000. Since queue 200 has additional data, data transmission process 115 moves another 4,000 byte data chunk for queue 200 into priority queue 210. However, the packet tag for this data chunk is computed as 80,000+(10×4,000)=120,000. Note that, after time 4, queue 200 has 8,000 bytes queued: 4,000 bytes stored in queue 200, and 4,000 bytes moved to queue 210 from queue 200.

As shown in FIG. 3A, at time 5, an 8,000 byte message arrives in queue 202. Data transmission process 115 moves a 4,000 byte data chunk from queue 202 into priority queue 210. Data transmission process 115 computes a packet tag for queue 202 that has a value of 80,000+(20×4,000)=160,000. This is due to the fact that queue 202 has an associated priority of 20, as shown by table 270. It should be noted that, at time 5, no data chunks stored in priority queue 210 are transmitted.

At time 6, data transmission process 115 determines that the data chunk in priority queue 210 that corresponds to queue 201 has the lowest packet tag (i.e., 100,000). Thus, data transmission process 115 transmits the data chunk corresponding to queue 201 to the appropriate remote destination (i.e., webcam client 151) and updates virtual time 260 to have a value of 100,000 (which is equal to the value of the packet tag for the most recently transmitted data chunk). Data transmission process 115 then determines that queue 201 has more data to be transmitted and thus computes a packet tag for the next data chunk for that queue. The packet tag for this next data chunk is computed as 100,000 (which is the value of updated virtual time 260)+(15×4,000), which is equal to 160,000. However, as mentioned above, the data chunk in priority queue 210 that was moved from queue 202 has a packet tag of 160,000. In order to enable data transmission process 115 to select a data chunk having a lowest packet tag, each packet tag corresponding to data chunks in priority queue 210 must be unique. Thus, as shown in FIG. 3A, the packet tag for the next data chunk in queue 201 is set to 160,001 (i.e., the computed packet tag is incremented by one).

As shown in FIG. 3B, at time 7, data transmission process 115 determines that the data chunk in priority queue 210 that was moved from queue 200 has the lowest packet tag value (i.e., a value of 120,000). Thus, data transmission process 115 transmits this data chunk from priority queue 210 to the appropriate client and virtual time 260 is updated to have a value of 120,000. Since queue 200 still has 4,000 bytes queued, data transmission process 115 moves the next 4,000 byte data chunk from queue 200 into priority queue 210. Data transmission process 115 then computes a packet tag for this data chunk having a value of 120,000+(10×4,000)=160,000. However, in this case, the data chunk in priority queue 210 that was moved from queue 202 already has a packet tag with a value of 160,000. Moreover, the data chunk in priority queue 210 that was moved from queue 201 has a packet tag with a value of 160,001. Therefore, in order for the packet tag for the data chunk that is to be moved from queue 200 into queue 210 to have a unique value, data transmission process 115 increments the calculated packet tag value of 160,000 by two, so that the data chunk moved from queue 200 has a packet tag with value 160,002.

At time 8, data transmission process 115 determines that the data chunk in priority queue 210 that was moved from queue 202 has the lowest valued packet tag (i.e., 160,000). Thus, data transmission process 115 transmits this data chunk to the appropriate destination client (i.e., shared folder client 152). Data transmission process 115 then updates virtual time 260 to have a value of 160,000. Since queue 202 still has 4,000 bytes to be transmitted, data transmission process 115 moves the next data chunk for queue 202 into priority queue 210. Data transmission process 115 then calculates the packet tag for this data chunk as 160,000+(20×4,000)=240,000.

At time 9, data transmission process 115 determines that the data chunk in priority queue 210 that was moved from queue 201 has the lowest packet value (i.e., 160,001). Thus, data transmission process 115 transmits this data chunk to webcam client 151 and updates virtual time 260 to have a value of 160,001. Since queue 201 has more data to be transmitted, data transmission process 115 moves the next data chunk from queue 201 to priority queue 210 and computes a packet tag for the data chunk. The packet tag is computed as 160,001+(15×4,000)=220,001.

Next, at time 10, data transmission process 115 determines that the data chunk in priority queue 210 that was moved from queue 200 has a packet tag with the lowest value (i.e., 160,002). Thus, data transmission process 115 transmits this data chunk to video client 150 and updates virtual time 260 to have a value 160,002. It should be recognized that after time 10, queue 200 has no more data to be transmitted and, therefore, data transmission process 115 does not calculate a new packet tag at this time.

At time 11, data transmission process 115 determines that the data chunk in priority queue 210 that was moved from queue 201 has the lowest packet value (i.e., 220,001). Thus, data transmission process 115 transmits this data chunk to webcam client 151 and updates virtual time 260 to have a value 220,001. It should be recognized that after time 11, queue 201 has no more data to be transmitted and, therefore, data transmission process 115 does not calculate a new packet tag at this time.

Finally, at time 12, the only data chunk remaining in priority queue 210 is the one that was moved from queue 202. Thus, data transmission process 115 transmits this final data chunk to shared folder client 152 and updates virtual time 260 to have a value of 240,000 (which is the packet tag of the last transmitted data chunk). Thus, should new messages arrive in any of queues 200, 201, or 202, packet tags will continue to be calculated using virtual time 260.

Figure 4:
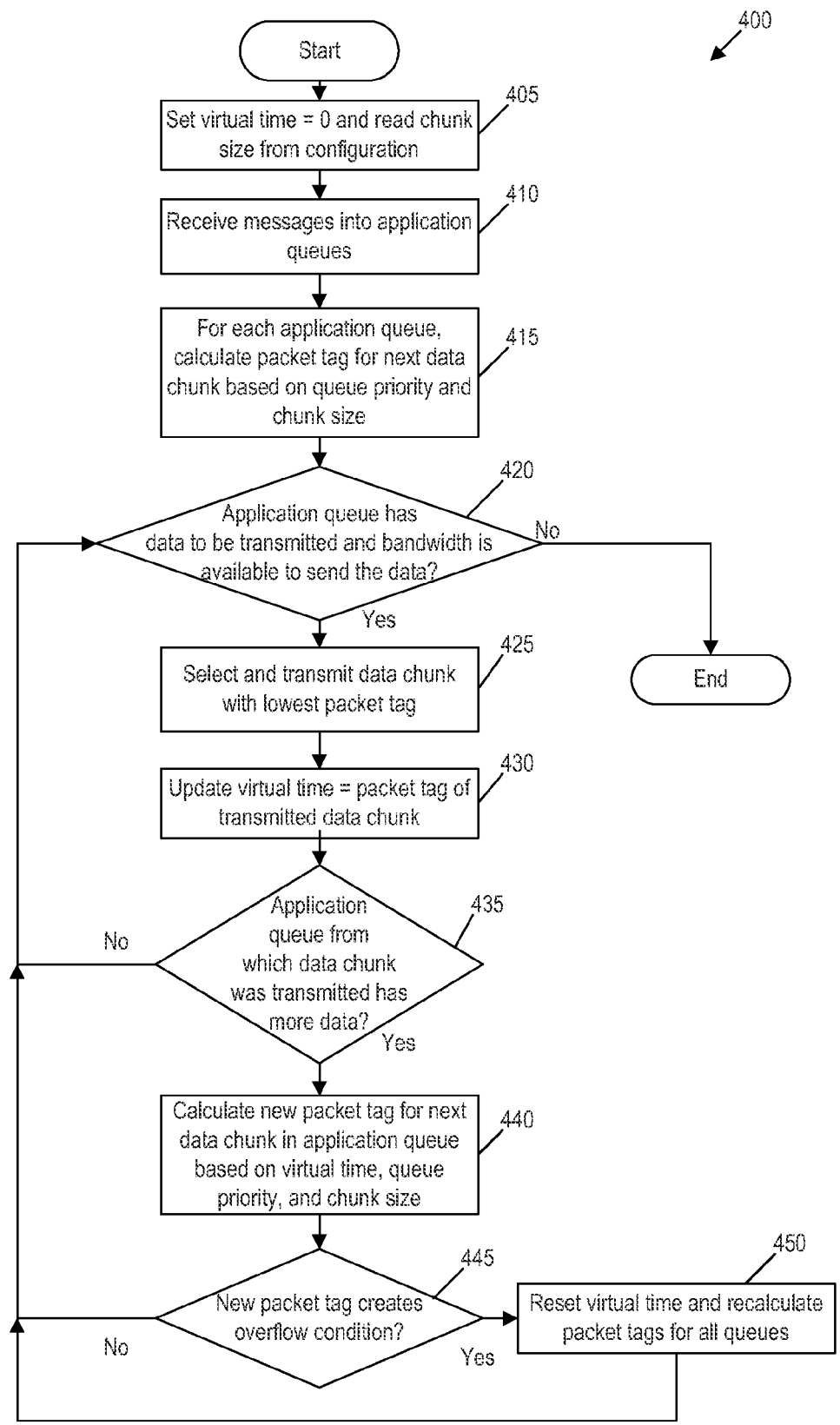
FIG. 4 is a flow diagram that depicts a method for transmitting data over a shared network using a weighted fair queue algorithm, in accordance with one or more embodiments.

FIG. 4 is a flow diagram that depicts a method 400 for transmitting data over a network using a weighted fair queue algorithm, in accordance with one or more embodiments. Method 400 is typically executed by application-level software, such as data transmission process 115. The below method is described using the components disclosed in FIGS. 1 and 2 as previously described. However, in some embodiments, method 400 is executed by software included in a network protocol stack as implemented in an operating system.

Method 400 begins at step 405, where data transmission process 115, after starting up, sets the virtual time (i.e., virtual time 260) to zero and reads a chunk size from configuration. As discussed, the chunk size may simply be a hardcoded value (e.g., 4 kB) in one embodiment. Next, at step 410, data transmission process 115 receives messages from one or more applications and places those messages into application queues, such as queues 200, 201, and 202 illustrated in FIG. 2. In addition, each application queue has an associated priority, as discussed above. Although such channel creation, including placing messages in application queues and setting up priorities, is depicted as occurred in step 410 before data is transmitted, it should be understood that channels may be created throughout the lifetime of the process, so step 410 may occur interchangeably with the sending of data.

Next, at step 415, data transmission process 115 calculates a packet tag value for the next data chunk to be transmitted from each of the application queues. As previously mentioned, the packet tag value is computed according to the following formula: packet tag value=virtual time+(queue priority×data chunk size). Each packet tag value is then associated with a corresponding next data chunk. This was illustrated in FIG. 2, where the packet tags are associated with the data chunks in priority queue 210.

At step 420, data transmission process 115 determines whether any of the application queues has data to be transmitted and if bandwidth is available to send the data. If none of the application queues has any data to be transmitted or there is insufficient bandwidth available to send data, then method 400 terminates. However, if any of the application queues has additional data to be transmitted and bandwidth is available to send the data, then method 400 proceeds to step 425.

At step 425, data transmission process 115 selects and transmits to the appropriate target destination the data chunk that has the lowest packet tag value (where the lowest packet tag value identifies the data chunk with the highest transmission priority. In one embodiment, the data chunk may be sent on a periodic poll and whenever data is sent/received.

At step 430, data transmission process 115 updates the value of virtual time 260 to the value of the packet tag corresponding to the last transmitted data chunk. Next, at step 435, data transmission process 115 determines whether the application queue from which the last transmitted data chunk was transmitted has additional data to be transmitted. If this application queue does not have any data left to be transmitted to a remote destination, then method 400 proceeds back to step 420, where data transmission process 115 determines again whether any of the application queues have additional data to be transmitted. However, if the application queue corresponding to the last transmitted data chunk does have additional data, then data transmission process 115 computes, at step 440, a packet tag for the next data chunk in the application queue. As was illustrated in the example of FIGS. 3A and 3B, the packet tag is computed based on the (newly updated) virtual time 260, as well as the current priority and data chunk size of the application queue from which the next data chunk is to be transmitted.

Next, at step 445, data transmission process 115 determines whether the packet tag calculated at step 445 creates an overflow condition. In one or more embodiments, an overflow condition is created when the computed packet tag exceeds the maximum value that virtual time 260 may take on. The maximum value of virtual time 260 may, for example, directly relate to the number of bytes allocated to store virtual time 260. Thus, if a four-byte word stores the value of virtual time 260, then the maximum value of virtual time 260 would be $2^{32}-1$. If the calculated packet tag exceeds this value, then this value would not be able to be stored as virtual time 260 when the corresponding data chunk is transmitted.

If an overflow condition would be created, then method 400 proceeds to step 450. At step 450, data transmission process 115 resets the virtual time and recalculates the packet tags for all queues so as to avoid the aforementioned overflow condition.

According to one embodiment, in order to address an overflow condition, data transmission process 115 first sets virtual time 260 back to a zero value (as was done at step 405). Next, data transmission process 115 determines which of the queues that has data remaining to be transmitted has the lowest valued packet tag. For this lowest-value queue, data transmission process 115 caches the packet tag value for the queue's next data chunk and proceeds to calculate the difference between the maximum virtual time value and the value of the cached packet tag. This difference is stored as a "delta" value, which is subsequently used to calculate the value of the next packet tag for the queue whose next packet tag caused the overflow condition.

Next, data transmission process 115 sets the packet tag value of the data chunk having the lowest valued packet tag to zero. For each of the remaining queues that contain data yet to be transmitted, data transmission process 115 calculates the difference between the packet tags for each of those queues and the cached packet tag. Data transmission process 115 then updates the values of the packet tags of the remaining queues such that the differences between the values of the updated packet tags and the "reset" packet tag (i.e., the packet tag whose value is reset to zero) are the same as these differences prior to the updates.

Finally, data transmission process 115 sets the packet tag value for the next data chunk corresponding to the queue from which the last data chunk was transmitted (i.e., the queue that caused the overflow condition) by first computing the product of the queue priority and the data chunk size for the queue (i.e., queue priority×data chunk size). Then, data transmission process 115 adds to this product the previous value of the virtual time (i.e., the virtual time value in effect before the virtual time was reset to zero). Data transmission process 115 then determines the amount that this sum exceeds the maximum virtual time and caches this amount as a rollover time. Finally, data transmission process 115 adds the rollover time to the cached delta value (i.e., the difference between the maximum virtual time value and the previously cached packet tag value) and sets the packet value for the queue from which the last data chunk was transmitted to equal this sum. In this way, the relative differences between the packet tags for each of the queues is maintained just as if no overflow condition had occurred. Method 400 then proceeds back to step 420 to determine whether any of the application queues has data remaining to be transmitted.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of transmitting data received from a plurality of data sources over a shared data path, the method comprising:

receiving and storing data of a first message in a first queue and extracting a first data chunk from the first message;

receiving and storing data of a second message in a second queue and extracting a second data chunk from the second message;

storing the extracted first and second data chunks in a third queue, wherein the third queue is configured to store a next data chunk, if any, to be sent from each of the first and second queues;

calculating first and second priority values for the first and second data chunks, respectively;

associating the first and second priority values, respectively, with the first and second data chunks stored in the third queue;

determining which of the first and second priority values indicates a higher priority;

if the first priority value indicates the higher priority, transmitting the first data chunk over the shared data path; and if the second priority value indicates the higher priority, transmitting the second data chunk over the shared data path.

2. The method of claim 1, wherein the first and second priority values are calculated based on, respectively, priorities assigned to the first and second queues.

3. The method of claim 2, wherein the first and second priority values are calculated based on, respectively, sizes of the first and second data chunks.

4. The method of claim 3, further comprising:

storing the priority value associated with the transmitted data chunk as a virtual time; and calculating a third priority value based on the virtual time, the priority assigned to the queue storing the message from which the transmitted data chunk was extracted, and the size of the transmitted data chunk.

5. The method of claim 4, further comprising:

extracting a third data chunk from the message from which the transmitted data chunk was extracted; and associating the third priority value with the third data chunk.

6. The method of claim 5, further comprising:
determining that the third priority value matches a priority value previously associated with a data chunk extracted from one of the messages; and
responsive to the determining:
adjusting the third priority value to a value that does not match a priority value associated with any data chunk, and
associating the adjusted third priority value with the third data chunk.

7. The method of claim 2, further comprising:
determining that the priority assigned to one of the first and second queues has changed; and
responsive to the determining, recalculating the priority value for the data chunk extracted from the message stored in the queue to which the changed priority is assigned.

8. The method of claim 4, further comprising:
determining that the virtual time exceeds a maximum value; and
responsive to the determining:
setting the virtual time to an initial value, and
recalculating each of the priority values associated with the data chunks, based on the virtual time.

9. A non-transitory computer-readable medium that stores instructions that are executable by a host computer, where the instructions, when executed, cause the host computer to perform a method of transmitting data received from a plurality of data sources over a shared data path, the method comprising:
receiving and storing data of a first message in a first queue and extracting a first data chunk from the first message;
receiving and storing data of a second message in a second queue and extracting a second data chunk from the second message;
storing the extracted first and second data chunks in a third queue, wherein the third queue is configured to store a next data chunk, if any, to be sent from each of the first and second queues;
calculating first and second priority values for the first and second data chunks, respectively;
associating the first and second priority values, respectively, with the first and second data chunks stored in the third queue;
determining which of the first and second priority values indicates a higher priority;
if the first priority value indicates the higher priority, transmitting the first data chunk over the shared data path; and
if the second priority value indicates the higher priority, transmitting the second data chunk over the shared data path.

10. The computer-readable medium of claim 9, wherein calculating the first and second priority values is based on, respectively, priorities assigned to the first and second queues.

11. The computer-readable medium of claim 10, wherein calculating the first and second priority values is based on, respectively, sizes of the first and second data chunks.

12. The computer-readable medium of claim 11, wherein the method further comprises:
storing the priority value associated with the transmitted data chunk as a virtual time; and
calculating a third priority value based on the virtual time, the priority assigned to the queue storing the message from which the transmitted data chunk was extracted, and the size of the transmitted data chunk.

13. The computer-readable medium of claim 12, wherein the method further comprises:
extracting a third data chunk from the message from which the transmitted data chunk was extracted; and
associating the third priority value with the third data chunk.

14. The computer-readable medium of claim 13, wherein the method further comprises:
determining that the third priority value matches a priority value previously associated with a data chunk extracted from one of the messages; and
responsive to the determining:
adjusting the third priority value to a value that does not match a priority value associated with any data chunk, and
associating the adjusted third priority value with the third data chunk.

15. The computer-readable medium of claim 10, wherein the method further comprises:
determining that the priority assigned to one of the first and second queues has changed; and
responsive to the determining, recalculating the priority value for the data chunk extracted from the message stored in the queue to which the changed priority is assigned.

16. The computer-readable medium of claim 12, wherein the method further comprises:
determining that the virtual time exceeds a maximum value; and
responsive to the determining:
setting the virtual time to an initial value, and
recalculating each of the priority values associated with the data chunks based on the virtual time.

17. A computer system, comprising:
a processor;
memory; and
an interface that connects the computer system to a shared data path,
wherein the processor is programmed to perform a method of transmitting data received from a plurality of data sources over the shared data path, the method comprising:
receiving and storing data of a first message in a first queue and extracting a first data chunk from the first message,
receiving and storing data packets of a second message in a second queue and extracting a second data chunk from the second message,
storing the extracted first and second data chunks in a third queue, wherein the third queue is configured to store a next data chunk, if any, to be sent from each of the first and second queues,
calculating first and second priority values for the first and second data chunks, respectively,
associating the first and second priority values, respectively, with the first and second data chunks stored in the third queue,
determining which of the first and second priority values indicates a higher priority,
if the first priority value indicates the higher priority, transmitting the first data chunk over the shared data path, and
if the second priority value indicates the higher priority, transmitting the second data chunk over the shared data path.

18. The system of claim 17, wherein the first and second priority values are calculated based on, respectively, priorities assigned to the first and second queues.

19. The system of claim 18, wherein the first and second priority values are calculated based on, respectively, sizes of the first and second data chunks.

20. The system of claim 19, wherein the method further comprises:
- storing the priority value associated with the transmitted data chunk as a virtual time; and
- calculating a third priority value based on the virtual time, the priority assigned to the queue storing the message from which the transmitted data chunk was extracted, and the size of the transmitted data chunk.

* * * * *